June 12, 1951 H. E. CARNAGUA 2,556,675
CONTROL SYSTEM
Original Filed Oct. 7, 1942 3 Sheets-Sheet 1

Inventor:
Harold E. Carnagua

June 12, 1951  H. E. CARNAGUA  2,556,675
CONTROL SYSTEM
Original Filed Oct. 7, 1942  3 Sheets—Sheet 2
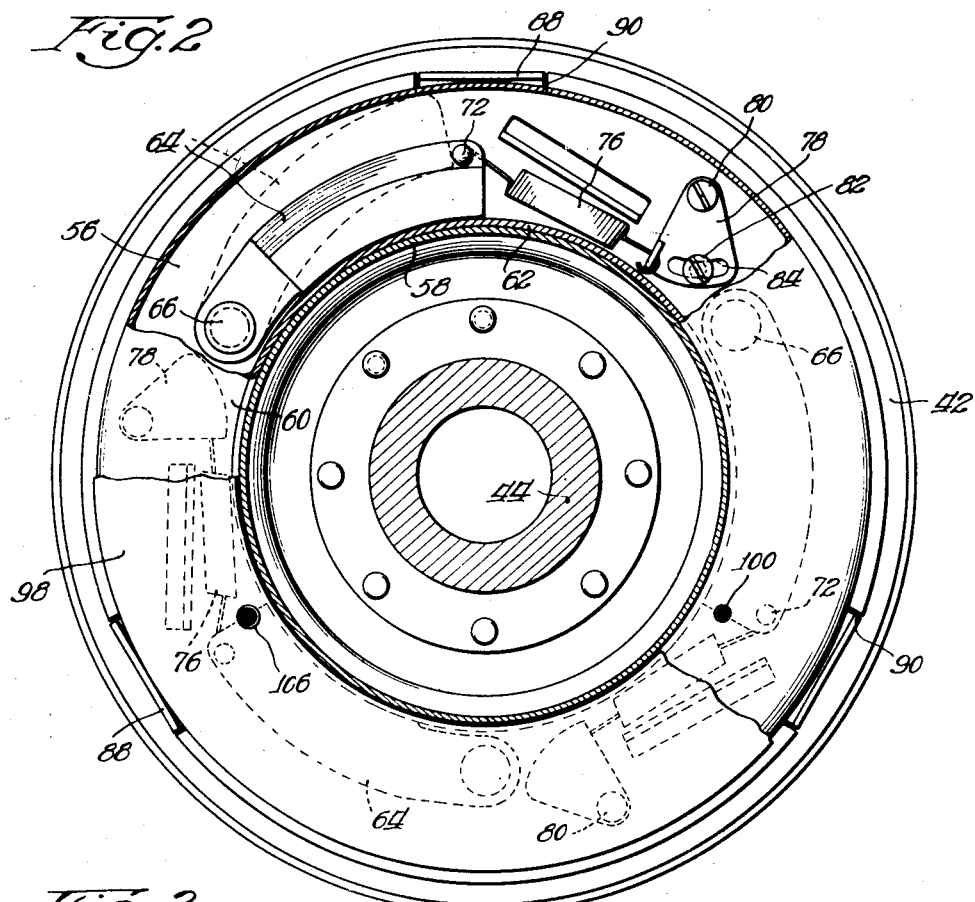
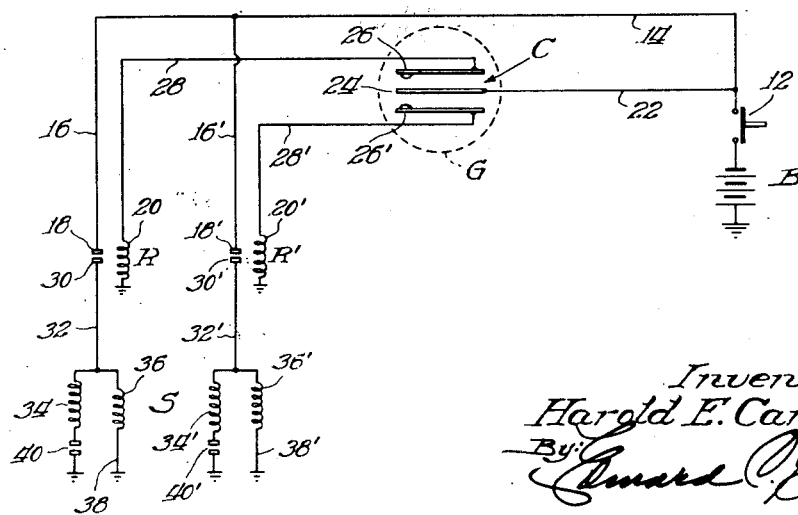
Inventor:
Harold E. Carnagua

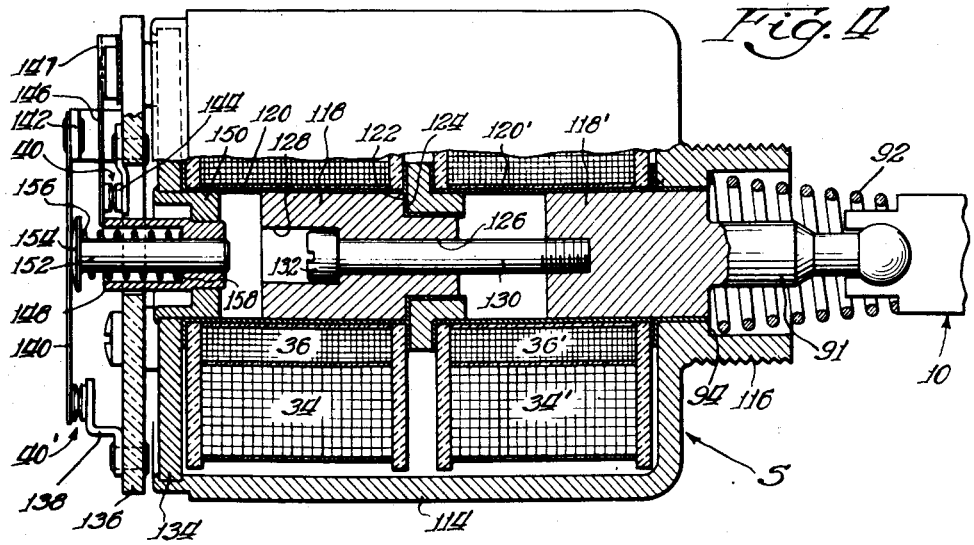

Patented June 12, 1951

2,556,675

UNITED STATES PATENT OFFICE 2,556,675

CONTROL SYSTEM

Harold E. Carnagua, Muncie, Ind., assignor to Borg-Warner Corporation, Chicago, Ill., a corporation of Illinois Original application October 7, 1942, Serial No. 461,169. Divided and this application May 26, 1948, Serial No. 29,229

2 Claims. (Cl. 175—335)

This invention relates to control mechanisms and has as its general object to provide an improved arrangement for imparting a two-stage movement to a shiftable control element in response to variations in speed of a rotating body. The invention is applicable to any mechanism in which a control element having two or more positions (in addition to a neutral or starting position) is controlled in accordance with the speed of rotation of a member of the mechanism, and is particularly useful in an automatic or semi-automatic transmission, such as that shown in the pending application of John M. Simpson and Harold E. Carnagua, Serial No. 426,122, filed January 9, 1942, wherein a valve having two active control positions is moved from a neutral position to each of these control positions under the control of a governor. This application is a division of the co-pending application of Harold E. Carnagua, Serial No. 461,169, filed October 7, 1942, now Patent No. 2,445,561.

One of the objects of the invention is to provide a relatively simple control arrangement for thus shifting a multiple position control element. To this end, the invention provides an arrangement in which the control valve or ultimate control element is linked to the governor through the medium of a novel multiple stage solenoid and a multiple stage switch, the switch being operated by the governor and in turn controlling the energization of the solenoid.

A further object of the invention is to provide an improved control mechanism embodying a novel multiple stage solenoid adapted to impart successive stages of movement to a common axially moving element.

A more specific object of the invention is to provide an improved control mechanism embodying a plurality of coils adapted to be energized successively and a plurality of armatures adapted to be energized by the respective coils, together with means for connecting both armatures to a common axially moving element in such a manner that the latter element is moved to one position by energized movement of one armature and to a second position by energized movement of another armature.

A further object of the invention is to provide, in an arrangement such as that last referred to, a solenoid having two sets of coils each comprising a moving coil and a holding coil, wherein the respective sets of coils are adapted to be successively energized and wherein means is provided for deenergizing the moving coil of a respective set of coils as soon as the corresponding armature has completed its energized movement.

Another object of the invention is to provide an improved control mechanism embodying a novel governor having a multiple stage action for closing in succession a plurality of sets of contacts of a multiple stage switch.

Other objects, the advantages and uses of the invention will become more apparent after reading the following specification and claims, and after consideration of the drawings forming a part of the specification, wherein:

Fig. 2 is a transverse sectional view of the governor taken as indicated by the line 2—2 of Fig. 1;

Fig. 3 is a skeletonized circuit diagram of a control mechanism embodying my invention;

Fig. 4 is a side elevation, partially in axial section, of the two-stage solenoid portion of the mechanism embodying my invention; and Fig. 5 is an end elevation of the solenoid mechanism.

Figure 1:
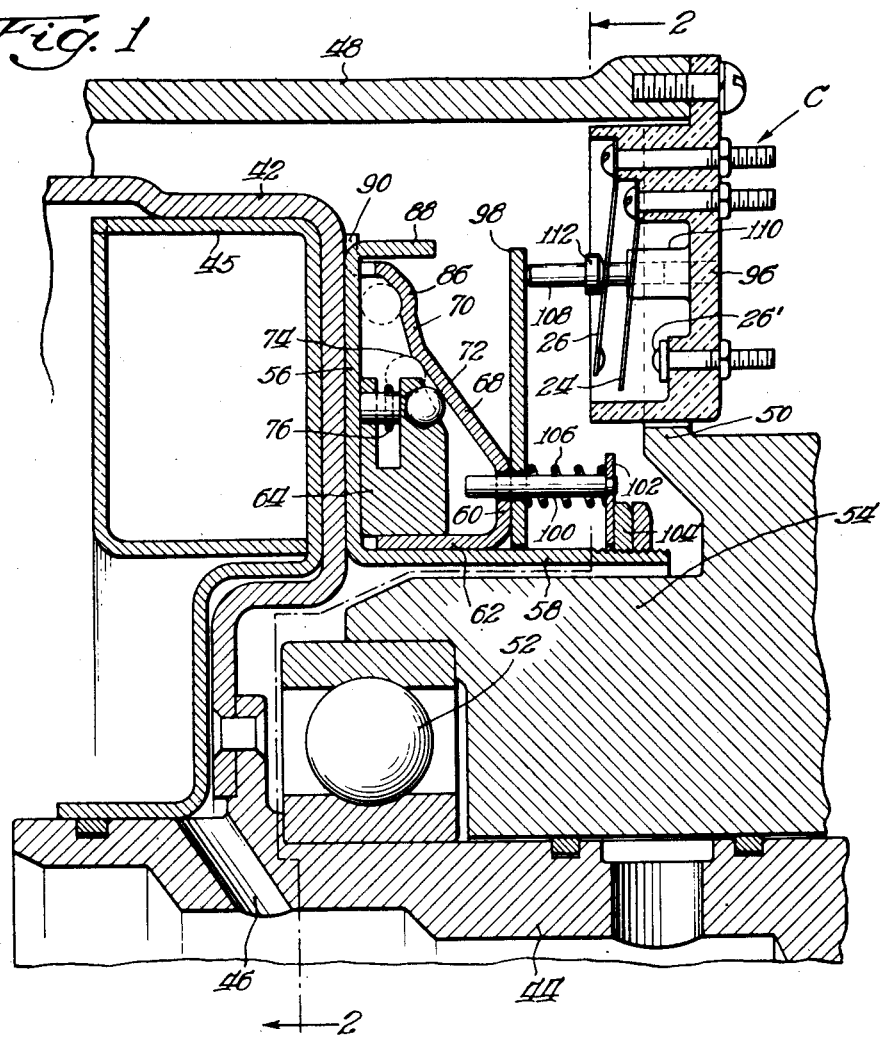
Fig. 1 is an axial sectional view of the governor and switch portion of a control mechanism embodying my invention.

As an example of one form in which my invention may be embodied, I have shown in Fig. 3 a skeletonized circuit diagram of a control mechanism wherein a two-stage solenoid, indicated diagrammatically at S and shown in detail in Fig. 4, is adapted to impart two stages of movement to a control element 10 (Fig. 4) when energized in successive stages of energization by a source of electric current B, under the control of a two stage switch, indicated generally at C, which in turn is controlled by a two-stage governor, indicated generally at G. Current from the source B passes first through a manual control switch 12, then through a common conductor 14 and parallel conductors 16, 16' to the contacts 18, 18' of a pair of relays indicated generally as R and R' respectively. Coils 20, 20' of the relays R, R' are energized through a common conductor 22 extending from the manual switch 12 to the common contact 24 of the switch C, then through the contacts 26, 26' and conductors 28, 28'. From the contacts 30, 30' of the relays R, R', conductors 32, 32' lead to the moving coils 34, 34' and also the holding coils 36, 36', respectively of the solenoid S. The holding coils 36, 36' are grounded directly as at 38, 38', while the moving coils 34, 34' are grounded through cutout switches 40, 40' by means of which the respective moving coils may be deenergized as soon as their corresponding armatures have completed their respective energized movements.

The control element 10 may be a valve having two active control positions, in which it is adapted to direct hydraulic fluid, under pressure, through different paths for effecting different or modified control function such as the application of a hydraulic torque converter lockup clutch on the one hand and the engagement of a planetary gear set lockup clutch on the other hand, in a transmission such as that shown in the above-identified application, Serial No. 426,122.

The hydraulic actuating unit of the planetary gear set lockup clutch is shown in Fig. 1, and includes a cylinder 42 secured to the driven shaft 44 of the transmission and a piston 45 operating in the cylinder 42 and adapted, when fluid is admitted to the cylinder through the port 46, to move forwardly for engaging the clutch. The overall casing of the transmission is shown at 48, being provided with an end wall 50 having a boss 54 carrying a bearing 52 in which the shaft 44 is journaled.

The governor is designed to occupy an annular space surrounding the boss 54 between the end of the cylinder 42 and the end wall 50. This space would otherwise be wasted. The governor comprises an axially fixed disc 56 mounted on the rear of the cylinder 42 and having a rearwardly extending sleeve 58, and an axially movable disc 60 including a hub portion 62 slidably mounted on the sleeve 58. The discs 56 and 60 enclose between them a plurality of centrifugal weights 64 which are pivoted upon the disc 56 as indicated at 66 in Fig. 2 and which are adapted, under the effect of centrifugal force, to swing outwardly, acting in successive stages upon two conical portions 68 and 70, respectively, of the disc 60 so as to move the disc 60 rearwardly in successive stages of movement. A ball 72, socketed in the end region of each weight, provides the contact with the conical disc portions 68 and 70. The conical portion 68 is separated from the portion 70 by an annular ridge 74 of greater inclination from a radial plane than that of the conical portion 68, so as to cause the weights to dwell at the end of the first stage of movement until an appreciably higher rate of rotation has been attained before commencing the second stage of movement. The conical portion 70 has a lesser inclination from the radial than the conical portion 68, in order that the second stage of movement may not be unduly prolonged. In this connection it may be noted that the outward extension of the weights is opposed by coil springs 76 each having one end attached to a free end of a respective weight and its other end attached to an adjustable anchor 78, pivoted at 80 to the disc 56 and secured in adjusted position by a screw 82 extending through an arcuate slot 84 therein and threaded into the disc 56. The pull of this spring increases with the increased outward movement of the weight, and the lower inclination of the conical portion 70 compensates for this increased pull, as well as cutting down the amount of increase in speed necessary to effect the second stage of movement as compared to that necessary to effect the first stage of movement, if desired. Outwardly of the conical portion 70, the disc 60 is provided with a dwell portion 86, in which the ball 72 may dwell during decrease in speed so that the first stage of return movement of the weight is commenced at a substantially lower speed than that at which the final stage of extension was completed. The same effect is produced in the transition from the first to the second stage of return movement, owing to the difference in inclination between the conical portions 70 and 68.

An axially shiftable driving connection between the discs 56 and 60 is effected by a tongue 88 formed on the periphery of the disc 56 and extending through a notch 90 in the periphery of the disc 60.

The multiple stage switch C may embody any approved contact mechanism, preferably of a snap action type, but for the sake of simplicity in illustration, it has been shown as comprising simply a pair of contacts 26 and 24 adapted to be closed in the first stage of governor action and a pair of contacts 24 and 26' adapted to be closed in the second stage of governor action, the respective contacts being mounted in a base 96 of suitable insulating material secured in transmission housing 48.

Movement is transmitted from the governor to the switch contact 26 by means of an annular plate 98 encircling the sleeve 58 and mounted upon pins 100 which are mounted in a washer 102 likewise encircling the sleeve 58 and abutted against a nut 104 threaded on to the end of the sleeve. Coil springs 106, encircling the pins 100, yieldingly resist the centrifugal weight energized movement of the disc 60 which is communicated to the plate 98. The movement of the plate 98 under centrifugal action is communicated to a pin 108 axially slidable in a boss 110 in the switch base 96 and having a shoulder 112 in engagement with the switch contact 26. In the first stage of governor action, the contact 26 will be moved into engagement with the contact 24, thus energizing the relay R which in turn establishes a circuit to the coils 34 and 36 of the solenoid. In the second stage of governor action, the contact 24 is moved into engagement with the contact 26', energizing the relay R' which in turn energizes the coils 34' and 36' of the solenoid.

The solenoid S comprises a casing 114 having an exteriorly threaded neck 116 by means of which it may be mounted on a support, and the pairs of coils 34, 36 and 34', 36', which are mounted in coaxial end-to-end relationship in the casing 114, and the armatures 118, 118' which are slidably mounted in the liners 120, 120' of the respective pairs of coils. The liner 120 has an offset portion 122 and the armature 118 has a corresponding shoulder 124 adapted to engage the offset 122 to limit the movement of the armature 118 away from its energized position. The armature 118' is connected to the control element 10 by a stem 91 which extends through the neck 116. Movement of the armature 118' under energized solenoid action is yieldingly resisted by a spring 92 encircling the stem 91, one end of the spring 92 being engaged against the control element 10 and the other end of the spring 92 being engaged against a shoulder 94 in the neck 116. The armature 118 has a bore 126, one end of which is enlarged as at 128. A draft link 130 in the form of a bolt is extended through the bore 126, has a head 132 received in the enlarged portion 128 of the bore, and is threaded at its other end into the armature 118'. The link 130 forms a lost motion draft connection between the armatures 118 and 118' by means of which energized movement of the armature 118 is transmitted to the armature 118' to produce the first stage of movement of the control element 10, and permitting the armature 118' to move further in the same direction to produce the second stage of movement of the control element 10, while the armature 118 remains stationary. During this second stage of movement the draft link 130 slides in the bore 126.

Opposite the neck 116, the casing 114 is closed by an end wall 134 on which is mounted an annular switch base 136 of suitable insulating material. The switch 40′ comprises a fixed contact carried by a bracket 138 mounted on the base 136 and a movable contact carried by a spring arm 140 mounted on a bracket 142 on the base 136 and biased toward the closed position of the contacts. The switch 40 comprises a fixed contact 144 secured against the base 136 and a movable contact carried by a spring arm 146 having a bracket portion 147 secured to the base 136. The free end of the spring arm 146 extends beyond the contact which it carries, and is adapted to be engaged by a sleeve 148 slidably mounted in a bushing 150 which in turn is mounted in the center of the solenoid casing end wall 134. Slidably mounted within the sleeve 148 is a push pin 152 having a head 154 engaging the arm 140 of the switch 40′. A light coil spring 156, received in an enlargement of the bore of the sleeve 148, has one end engaged against the shoulder 158 defining the end of such enlargement and its other end engaged against the head 154 so as to yieldingly maintain the push pin 152 in engagement with the arm 140.

In the operation of the solenoid, the first stage of action is effected by energization of the coils 34 and 36, drawing the armature 118 to the left as viewed in Fig. 4. At the conclusion of this movement, the armature 118 contacts the end of the sleeve 148 which normally projects slightly beyond the bushing 150, and moves the sleeve 148 to the left so as to open the switch 40, thus deenergizing the moving coil 34 while the holding coil 36 remains energized. The armature 118 is stopped by its contact with the bushing 150. This first stage of armature movement is transmitted from the armature 118 through the draft link 130 to the armature 118′ and thence to the control element 10 through the stem 92.

In the second stage of solenoid action, the coils 34′ and 36′ are energized, drawing the armature 118′ further to the left while the draft link 130 moves axially through the bore 126 of the armature 118, into contact with the push pin 152, moving the latter to the left and opening the switch 40′. This deenergizes the moving coil 34′, leaving the holding coil 36′ energized. This second stage of movement is transmitted directly from the armature 118′ to the control element 10, moving the latter to its second active control position.

These two stages of solenoid action are produced by the closing of the switch contacts 26, 24 and the subsequent closing of the contacts 24, 26′, in response to the two stages of governor action. As long as the governor weights remain in their fully extended positions, the control element 10 will be maintained in its second active control position by the solenoid. When the weights drop back to their intermediate positions, the springs 106 will move the plate 98 to the left as viewed in Fig. 1, permitting the contacts 24 and 26′ to open and deenergizing the coils 34′ and 36′ of the solenoid. The spring 92 will then move the control element 10 back to its intermediate or first active control position, causing the controlled mechanism, if it be a transmission such as that described in the above-identified application, Serial No. 426,122, to be shifted down to the gear ratio controlled by said intermediate position. When the governor weights recede from their intermediate positions, the plate 98 will be moved further to the left by the springs 106, permitting the contacts 24 and 26 to open, completely deenergizing the solenoid and permitting the spring 92 to move the control element 10 back to its starting position.

I claim:

1. In a control mechanism of the character described, a control member movable in one direction through two stages successively from an initial position to an intermediate position through the first stage of movement and from said intermediate position to a final position through the second stage of movement, and also movable in the opposite direction successively through the second and first stages back into its initial position, speed responsive means controlling the movement of said member comprising a solenoid having a movable armature, means operatively connecting said armature and control member for movement thereof in unison, a primary coil operable upon energization thereof to impart a first stage of movement to said armature in a direction and of an extent sufficient to move said control member through its first stage of movement to its intermediate position, a holding coil operable upon energization thereof to maintain said armature in the position to which it is moved by energization of said primary coil, a second primary coil operable upon energization thereof to impart a second stage of movement to said armature in a direction and of an extent sufficient to move said control member through its second stage of movement into its final position, a second holding coil operable upon energization thereof to maintain said armature in the position to which it has been moved by said second primary coil, an electric circuit for each of said coils, a pair of normally open contacts disposed in and common to the circuits for said first primary and first holding coil, a pair of normally open contacts disposed in and common to the circuit for said second primary and second holding coil, a relay magnet for each of said pairs of contacts operable upon energization thereof to close its respective pair of contacts and cause initial energization of the respective primary coil which it controls, means operable upon energization of either primary coil and corresponding movement of its armature for subsequently opening the circuit therethrough, a circuit for each relay magnet, a pair of normally open contacts in each of said latter circuits, a rotary member, and governor means operable when the speed of rotation of said rotary member attains a predetermined minimum for closing the pair of normally open contacts in the circuit of the relay magnet which controls the movements of the contacts which are disposed in the circuit of the first primary and the first holding coil, and operable when said member attains a higher predetermined rate of rotation for closing the pair of normally open contacts in the circuit for said other relay magnet which controls the movements of the contacts which are disposed in the circuits of the second primary and second holding coil.

2. In a control mechanism of the character described, a control member movable in one direction through two stages successively from an initial position to an intermediate position through the first stage of movement and from said intermediate position to a final position through the second stage of movement, and also movable in the opposite direction successively through the second and first stages back into its initial position, speed responsive means controlling the movement of said member comprising a solenoid having a movable armature, means operatively connecting said armature and control member for movement thereof in unison, a primary coil operable upon energization thereof to impart a first stage of movement to said armature in a direction and of an extent sufficient to move said control member through its first stage of movement to its intermediate position, a holding coil operable upon energization thereof to maintain said armature in the position to which it is moved by energization of said primary coil, a second primary coil operable upon energization thereof to impart a second stage of movement to said armature in a direction and of an extent sufficient to move said control member through its second stage of movement to its final position, a second holding coil operable upon energization thereof to maintain said armature in the position to which it has been moved by said second primary coil, a normally open electric circuit for each of said coils, a pair of normally open contacts operable upon closing thereof to cause energization of the circuits for said first primary and first holding coil, a pair of normally open contacts operable on closing thereof to cause energization of said second primary and said second holding coil, a rotary member, and governor means operable as the speed of rotation of said rotary member increases to successively close said latter pair of contacts.

HAROLD E. CARNAGUA.

REFERENCES CITED

The following references are of record in the file of this patent:

UNITED STATES PATENTS

| Number | Name | Date |
|---|---|---|
| 1,085,425 | Hobe | Jan. 27, 1914 |
| 1,316,187 | Rogers | Sept. 16, 1919 |
| 1,476,914 | Oakley | Dec. 11, 1923 |
| 2,350,431 | Vatter | June 6, 1944 |